United States Patent [19]

Gates et al.

[11] Patent Number: 4,794,863

[45] Date of Patent: Jan. 3, 1989

[54] MOTIVE STRUCTURE FOR TRANSPORTING WORKPIECES

[75] Inventors: Stephen M. Gates, Ossining; Michael Liehr, Yorktown Heights, both of N.Y.; Michel G. E. G. Renier, Namur, Belgium; Gary W. Rubloff, Waccabuc, N.Y.

[73] Assignee: International Business Machines Corporation, Armonk, N.Y.

[21] Appl. No.: 171,320

[22] Filed: Mar. 21, 1988

[51] Int. Cl.[4] .............................................. B61B 13/00
[52] U.S. Cl. ..................................... 104/165; 104/140; 105/463.1; 198/776
[58] Field of Search .................. 104/140, 162, 165; 105/463.1; 198/776

[56] References Cited

U.S. PATENT DOCUMENTS

| | | | |
|---|---|---|---|
| 213,695 | 3/1879 | Sanford | 198/737 |
| 1,532,022 | 3/1925 | Bamford et al. | 198/737 |
| 1,919,199 | 7/1933 | Camerota | 198/776 |
| 2,009,927 | 7/1935 | Henry | 19/64.5 |
| 2,705,070 | 3/1955 | Camer, Jr. et al. | 198/767 X |
| 2,951,581 | 9/1960 | Long et al. | 198/770 X |
| 3,789,976 | 2/1974 | Paul, Jr. | 198/776 |
| 4,075,949 | 2/1978 | Davis et al. | 104/162 |
| 4,275,978 | 6/1981 | Brooks et al. | 198/775 X |
| 4,286,422 | 9/1981 | Howe, Jr. | 198/776 X |
| 4,345,867 | 8/1982 | Minasov et al. | 414/287 |

FOREIGN PATENT DOCUMENTS

| | | |
|---|---|---|
| 497303 | 3/1930 | Fed. Rep. of Germany. |
| 887175 | 1/1954 | Fed. Rep. of Germany. |
| 808003 | 1/1959 | United Kingdom. |
| 0893557 | 4/1962 | United Kingdom ................ 104/162 |

*Primary Examiner*—Mark Rosenbaum
*Assistant Examiner*—Frances Chin
*Attorney, Agent, or Firm*—John J. Goodwin

[57] ABSTRACT

An improved motive structure for transporting workpieces (wafers, chip, packages, etc.) between processing stations or tools in a manufacturing operation. The structure includes a first circular crankshaft assembly connected to center axles disposed at right angles to the transport motion. A second such crankshaft assembly is located some distance along the path of motion. Three driverods are connected between the first and second crankshaft assemblies, each affixed 120° apart on the circular crankshafts so that each driverod is moved upward, then forward along the transport direction, then downward and backward to its original position as the crankshafts go through a complete 360° rotation. The structure is disposed beneath transport rails which hold movable containers for holding the workpieces. As a driverod moves up and forward, it contacts a spring-loaded element on the movable container and drives it forward by friction contact. As each driverod begins to move down and away from the workpiece container, the next driverod is being rotated up and forward to continue to move the container along the rails. Pluralities of such structures are linearly arranged to provide an extended transport system.

5 Claims, 1 Drawing Sheet

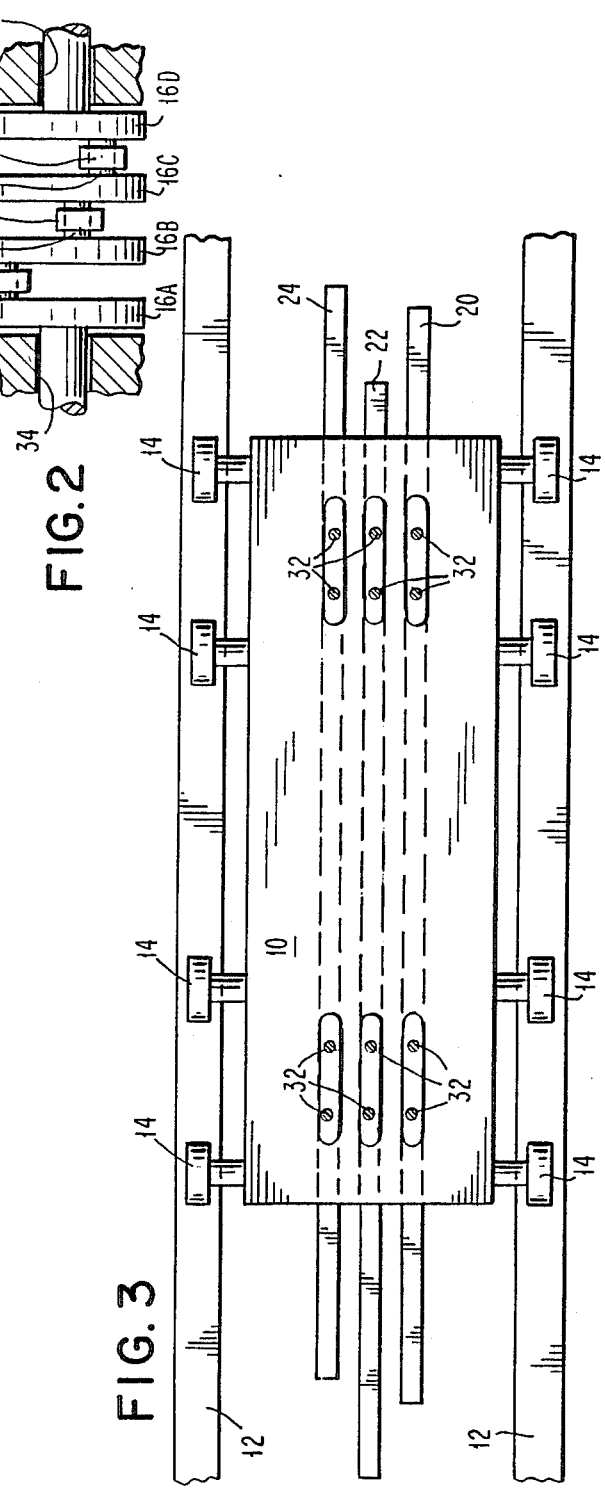

MOTIVE STRUCTURE FOR TRANSPORTING WORKPIECES

BACKGROUND OF THE INVENTION

1. Field of the Invention

The present invention relates to a motive structure for transporting objects, and more particularly to a circular crankshaft and driverod assembly for moving workpieces between workstations.

2. Description of the Prior Art

There are a very large number and wide variety of mechanical and electro mechanical apparatus for conveying objects through a distance, linear or otherwise, in the available art. Since the advent of the manufacturing assembly line, many devices and structures have been developed for transporting or conveying tools or workpieces through a distance.

Examples of such prior art include U.S. Pat. No. 4,075,949, issued Feb. 28, 1978 to Davis et al, entitled CART PUSHING APPARATUS which describes an apparatus for intermittently pushing a plurality of aligned carts along a predetermined path. The apparatus includes a pair of oscillating pusher bars having a plurality of aligned lugs thereon which engage a portion of the undersurface of the carts and push them forward as the bars move in a forward direction. As the pusher bars move in the opposite direction, the lugs disengage from the cart, so as to permit the cart to remain stationary.

U.S. Pat. No. 213,695, issued Mar. 25, 1879 to Sanford entitled IMPROVEMENT IN MOVEMENTS FOR ELEVATING AND CONVEYING, describes a structure that consists in the combination of two series of bars and cranks, or their equivalents, imparting to them vibratory and longitudinal movements, so that one series of the bars work forward and upward at the same time that one series of them work rearward and downward, whereby articles to be transported from place to place may be moved along the faces of said base continuously, and with a positive motion.

In U.S. Pat. No. 4,345,867, issued Aug. 24, 1982 to Minasov et al entitled COKE DRY QUENCHING PLANT, a lift structure is disclosed wherein each of the lifts is provided with a carriage transporting a body for carrying coke upwards from the hoisting shaft to the coke-charging means, and downwards. Also provided in the plant is a trestle installed along the quenching chambers on the level of the lifts coming out from the hoisting shafts, and a means for transferring the carriage of the lift in horizontal plane along the trestle and perpendicularly thereon.

U.S. Pat. No. 1,919,199, issued Jan. 13, 1932 to Camerota entitled CONVEYER FOR CYLINDRICAL OBJECTS, describes a conveyer with mechanical means for progressing a series of pipe flasks or other cylindrical objects from one station to another with intermittent rolling movement and with each object maintained at a spaced distance from the next object and with its axis truly perpendicular to the longitudinal axis of the conveyer.

Other references in the general field of interest include U.S. Pat. Nos. 2,009,927 and 1,532,022, UK Pat. No. 808,003 and German Pat. Nos. 497,303 and 887,175.

SUMMARY OF THE INVENTION

An object of the present invention is to provide an improved motive structure for transporting objects.

Another object of the present invention is to provide an improved motive structure including a circular crankshaft and driverod apparatus. A further object of the present invention is to provide a modular motive structure for transporting workpieces between processing stations.

Still another object of the present invention is to provide an improved crankshaft and driverod apparatus wherein a plurality of driverods are connected on the crankshaft in spaced arrangement to sequentially engage a workpiece transport as the crankshaft is rotated.

DESCRIPTION OF THE DRAWINGS

FIG. 1 is a schematic illustration of a side view of a transport system including crankshaft and driverods according to the principle of the present invention.

FIG. 2 is a front view of the crankshafts and driverod assembly depicted in FIG. 1.

FIG. 3 is a top view of the transport system shown in FIG. 1.

DESCRIPTION OF A PREFERRED EMBODIMENT

The transportation of samples such as semiconductor wafers, packages, storage disk media and the like, between processing tools in manufacturing is a critical operation because contamination between the many processing steps degrades yield and reliability, thereby increasing cost. Chemical contamination can arise from the exposure to room ambients during transport of samples between tools, as well as from impurities in the processing tool environments. Particulate contamination is generated both in processing tools such as by friction associated with mechanical motion, especially sliding motion and in even the best clean room environment.

As a result, one known technique for advanced computer component manufacturing strategies is to transfer samples between processing stations or tools in a controlled ambient environment, such as inert gas or vacuum. This is a particularly compatible approach in certain processes such as low pressure chemical vapor deposition or molecular beam epitaxy, where the ultra high vacuum conditions required for the process itself have already stimulated the development of vacuum transport systems using a variety of approaches such as bellows or magnetically driven motions, chain-link drives and the like. Load-lock sample introduction stages are normally an integral part of this approach, which seeks contaminant control by maintaining the transport system in a small controlled environment rather than a large clean room environment.

However, existing sample transport schemes, particularly those capable of operation in high or ultra high vacuum, are highly complex and costly. Long bellows and chain drive systems tend to generate particulates from the mechanical motions. Furthermore, such existing systems are not modular, that is, they do not allow for changes such as increasing the transport length, turning corners to go in a different direction, or raising the samples to a new height.

The present invention provides an improved transport structure which offers significant advantages over previous approaches. By utilizing a crankshaft drive system, the drive system is considerably simplified, while the need for few moving parts leads to expected lower cost and reduced particulate generation in the tool. The drive mechanism is located entirely below the samples, minimizing particulate contamination. Finally, the design is highly modular, so that the transport line can be extended to large distances easily, and 90° turns in both vertical and horizontal planes are readily accommodated.

Referring to FIG. 1, a side view of an embodiment of a transport system according to the present invention is shown for moving a transportation means such as a workpiece tray or boat 10 along a predetermined path on a pair of parallel elongated rails 12. The tray 10 includes wheels 14 which allows it to ride smoothly on the two rails 12. The tray 10 contains specifically four axles, each of which uses two ball bearing mounted wheels so that the motion of the tray is confined to the direction of the rail axis. A modification to the tray 10 may be used wherein additional wheels are provided for the tray 10 which are located beneath the rails 12. With wheels located above and below the rails, the tray 10 is prevented from tipping over when the front axles encounter and extend past a gap in the rails.

A drive apparatus for the system for moving the tray 10 includes two crankshafts elements 16 and 18 which are always moved in phase. Three elongated driverods members 20,22,24 are connected by ball bearings to three corresponding off-axis points 26,28 and 30 as shown in FIG. 2 (120° apart) on the two crankshafts 16 and 18 so that all three driverods 20,22,24 always remain horizontal and the propulsion initiated at either crankshaft is never blocked. The drive apparatus for the system is placed in the modular transport tube environment (controlled ambient or vacuum chamber), and the crankshafts are driven from outside by simple rotary feedthroughs 34 shown in FIG. 2.

FIG. 2 shows an end view of one of the crankshafts, such as crankshaft 16, illustrating that it includes four rotary members 16A, 16B, 16C and 16D supporting driverods 20,22, and 24. As the crankshaft assembly 16 is rotated, each driverod moves up and forward for one quarter of crankshaft rotation and down and forward for the next quarter of the crankshaft rotation, down and backward for the third-quarter rotation and up and backward for the final quarter rotation. Since the driverods are spaced 120° apart, their motion is sequential. The use of three driverods is for example only. If another wheel were to be added to the crankshaft, four driverods (spaced 90° apart) can be used and so forth.

In the arrangement shown in FIG. 1, the driverods 20,22,24 move both horizontally and vertically as described. To achieve the transport motion of the tray 10 from the driverods 20,22,24, the unidirectional motion of the driverods in their higher (elevated position) is exploited. Three sets of springloaded, vertically movable pickup arms 32 and plate member 36 are attached to the movable tray 10, each one aligned directly above a driverod as shown in FIG. 3. As the driverod moves upward, it engages the pickup arm above it, and the horizontal forward motion of the driverod in this high portion of its motion is transferred to the sample stage. Further, in the rotation of the crankshaft, this driverod is lowered and thereby decoupled from the sample stage, after which a second driverod has risen to a height sufficient to takeover and cause further translation of the stage in the same forward horizontal direction.

The springloaded pickup arm is free to move a limited range in the vertical direction, so that changes in the height of the driverod as the crankshaft is rotated are readily accommodated. As the driverod contacts the pickup arm, a small amount of friction between them prevents sliding and transfers horizontal motion from the driverod to the tray, which moves very easily in the horizontal direction due to its ball bearing suspension. Since the horizontal velocities of the three driverods are always different, the motion must be activated in one of two ways. In one technique, the height at which the driverods engage the pickup arms can be set to guarantee that only one driverod/pickup arm set is in contact at one time; this prevents sliding friction between any driverod and its pickup arm, thereby minimizing particulate generation. In another technique, the springloaded pickup arms may be built with sufficient horizontal freedom ("play") that two driverod/pickup arms sets are in contact at the same time.

The transport system of the present invention is suitable for modular applications wherein the direction of work station locations is not in a straight line. Thus at desired junctions in the transport system, the workpiece may be lifted from the tray 10, the tray moved away, and the workpiece placed on a second tray moving on rails at right angles to the first. Crossing of two orthogonal rail systems is made possible by placing gaps in each rail system, which is permitted because of the four axle design of the tray and the wheels 14. In such a cross-motion application, the drive systems can be displaced somewhat from each other in the vertical direction. Furthermore, a manipulator used to lift the workpiece can raise or lower the workpiece to other transport lines at considerably different elevation.

The advantages of the described system of the present invention over other existing transportation systems include the feature that the drive system is rugged, with rigid driverods connected by ball bearings to the crankshafts, so that long motions can be used. Also, there is no restriction to the length of one assembly, in contrast to a chain-driven system which is limited in length due to the tension in the chain. Because of the mechanical strength of the drive system, it can be extended notably beyond the axles, making coupling of modules more flexible and the proposed system being modular, accommodating sample motion in orthogonal directions as well as long travel in each direction is possible. The craftshaft assembly is mounted entirely underneath the sample level, thus preventing particulates from dropping onto the sample surfaces, and there are few moving parts that scrape on any surface. In contrast, prior art systems involve much more moving surface area and sliding surface area, such as in the numerous links in a chain drive system.

For some applications of the present invention, vacuum ambient in the transport system may be desirable and can be readily accommodated. The use of standard vacuum devices, such as stainless steel ball bearings and commercial rotary motion devices, makes baked ultra high vacuum operation straightforward. Alternatively, the present system can be employed with controlled, clean atmospheric pressure gaseous ambients such as purified inert gas.

Having thus described our invention, what we claim as new, and desire to secure by Letters Patent is:

1. Apparatus for moving at least one transportation means along a predetermined path comprising:

a frame structure including a pair of parallel elongated frame members, at least one transportation means disposed on said parallel frame members and adapted to move thereon, at least one drive structure for moving said transportation means disposed proximate to said parallel frame members, said drive structure including first and second rotatable crankshaft elements located a given distance apart parallel to said parallel frame members each of said crankshaft elements including a plurality of crankshaft wheels on a common axis of rotation, said drive structure further including a plurality of elongated members connected to said crankshaft wheels at each end thereof, said ends of said members being connected to said crankshaft wheels at equally spaced angular positions relative to each other, said at least one transportation means further including contact elements flexibly mounted below said transportation means, wherein said elongated frame members supporting said transportation means and said proximately disposed drive structure are spatially oriented so that said elongated members of said drive means are sequentially brought into connection with said contact elements of said transportation means as said crankshaft wheels rotate through each revolution, each one of said elongated member of said drive means moving said transportation means linearly along said predetermined path on said parallel elongated frame members during contact with said contact element.

2. Apparatus according to claim 1 wherein said pair of parallel elongated frame members is a pair of rails and wherein said transportation means is a tray element including a plurality of wheels therein mounted on said pair of rails.

3. Apparatus according to claim 2 wherein said tray element wheels include wheels mounted above and below said rails.

4. Apparatus according to claim 2 wherein said contact elements are a plurality of spring supported friction plates mounted on said tray and wherein said elongated drive structure members are sequentially brought into contact with said friction plates to propel said tray along said rails.

5. Apparatus according to claim 2 wherein said drive means include N elongated drive members connected to said crankshaft wheels spaced apart by 360/N degree angles.

* * * * *